United States Patent [19]

Fry

[11] E Patent Number: Re. 32,260

[45] Reissued Date of Patent: Oct. 7, 1986

[54] TANTALUM POWDER AND METHOD OF MAKING THE SAME

[75] Inventor: Stanley S. Fry, North Chicago, Ill.

[73] Assignee: Fansteel Inc., North Chicago, Ill.

[21] Appl. No.: 634,036

[22] Filed: Jul. 24, 1984

Related U.S. Patent Documents

Reissue of:

[64] Patent No.: 4,009,007
Issued: Feb. 22, 1977
Appl. No.: 595,569
Filed: Jul. 14, 1975

[51] Int. Cl.[4] ..... C22C 1/04; H01G 9/05

[52] U.S. Cl. ..... 75/230; 75/0.5 AB; 75/0.5 BB; 75/245; 75/252; 75/255; 361/305; 420/427; 428/472

[58] Field of Search ..... 75/230, 0.5 AB, 0.5 BB, 75/245, 252, 255; 361/305; 420/427; 428/472

[56] References Cited

U.S. PATENT DOCUMENTS

| | | | |
|---|---|---|---|
| 3,418,106 | 12/1968 | Pierret | 75/245 X |
| 3,647,415 | 3/1972 | Yano et al. | 75/0.5 BB |
| 3,723,838 | 3/1973 | Kumagai | 317/258 |
| 3,825,802 | 7/1974 | Kumagai et al. | 361/433 |
| 3,867,129 | 2/1975 | Ronneau et al. | 75/0.5 BB |

*Primary Examiner*—John F. Terapane
*Assistant Examiner*—Matthew A. Thexon
*Attorney, Agent, or Firm*—Morgan & Finnegan

[57] ABSTRACT

Tantalum powder capable of producing anodes of improved electrical capacitance is prepared by the addition of phosphorus-containing materials in amounts from about 5 to about 400 ppm based on elemental phosphorus. In one embodiment, the flow properties of the powder are also improved.

36 Claims, No Drawings

TANTALUM POWDER AND METHOD OF MAKING THE SAME

Matter enclosed in heavy brackets [ ] appears in the original patent but forms no part of this reissue specification; matter printed in italics indicates the additions made by reissue.

BACKGROUND OF THE INVENTION

This invention relates to tantalum powders and to anodes prepared therefrom, and specifically to powders capable of producing anodes improved in electrical capacitance and, in one embodiment, powders having improved flow characteristics.

The use of tantalum powders for the preparation of electrodes in electrolytic capacitors is well known. Such electrodes are made by pressing the tantalum powder to form a coherent compact, sintering the compact and subsequently forming a dielectric film on the sintered product.

In such capacitors it is desired to have as high a specific capacity CV/g. as possible. U.S. Pat. No. 3,418,106 discloses an agglomerated tantalum powder crushable as tantalum which when fabricated into an electrode provides enhanced specific capacity. The agglomerated tantalum powder described in this patent also has improved flow characteristics as compared to prior powders.

U.S. Pat. No. 3,825,802 discloses improvements in various properties of tantalum capacitors, including specific capacity, by the addition to the tantalum of any of several "dopants", including phosphorus. The range of dopant disclosed is from 0.47 to 2.71 atomic percent which, for phosphorus is equivalent to from about 800 to 4600 parts per million and the improvement in specific capacity (for nitrogen, the preferred species) ranges from about 2% (at the lower end of the range) to about 6.3% (at the upper end) when the anode is sintered at 1900° C.

SUMMARY OF THE INVENTION

In accordance with the present invention a tantalum powder, capable of producing capacitors of improved specific capacity is prepared by the addition of a tantalum powder of a small amount of a phosphorus-containing material, substantially less than the range disclosed in U.S. Pat. No. 3,825,802 and in the range from about 5 to about 400 parts per million, based on elemental phosphorus. In the preferred embodiment of this invention, the addition of the phosphorus-containing material is combined with the agglomeration of tantalum powder in accordance with U.S. Pat. No. 3,418,106, but the addition to an unagglomerated powder of a phosphorus-containing material in the range of from about 5 to about 400 parts per million based on elemental phosphorus also improves the specific capacity of capacitors made from such powders.

It is necessary, in accordance with this invention, that a phosphorus-containing material be added to the tantalum powder, or to a tantalum hydride powder before reduction thereof to tantalum. When phosphorus is present in a tantalum powder as an incidental impurity, either carried over from the original ore or introduced as an impurity in the chemicals used in the normal preparation of the tantalum powder, the results of this invention are not obtained.

Nor are the results of this invention obtained when phosphorus-containing materials are added to tantalum powder which has been pressed and sintered into anode form, as disclosed in U.S. Pat. No. 3,308,350. However, the results of this invention are obtained when a phosphorus-containing material is added to a tantalum powder which has been pressed into anode form but not sintered.

The amount of phosphorus-containing material added to the powder in accordance with this invention is, as stated above, from about 5 to about 400 parts per million based on elemental phosphorus. Within this range, higher levels of phosphorus generally produce greater improvement in specific capacity values. At phosphorus levels above about 400 parts per million, a plateau is reached and further improvement in specific capacity values are not obtained. Furthermore, phosphorus additions in excess of about 400 parts per million based on elemental phosphorus adversely affect the green strength of anodes pressed from the powder and adversely affect its sintering properties.

The preferred phosphorus-containing materials are the inorganic phosphate salts, such as ammonium, sodium, potassium, calcium, barium and lead orthophosphates, ammonium mono-hydrogen orthophosphate, ammonium di-hydrogen orthophosphate, sodium mono-hydrogen orthophosphate, sodium di-hydrogen orthophosphate, and potassium di-hydrogen orthophosphate. Other suitable phosphorus-containing materials include elemental phosphorus, metallic phosphides, phosphorus oxides and acids, and organic phosphorus-containing materials, such as alkyl phosphates.

Phosphate materials containing no metallic cations, such as ammonium mono-hydrogen orthophosphate, ammonium dihydrogen orthophosphate and phosphoric acid, are particularly preferred because they do not introduce other metals into the tantalum powder with possible adverse effects on the d.c. leakage and breakdown voltage properties of the anodes produced therefrom.

When calcium orthophosphate is added as the phosphorus-containing material and when the material is added after agglomeration, an added advantage is obtained in that the flow characteristics of the final powder are improved.

In one preferred embodiment, both the specific capacity and the flow properties of tantalum powders are improved by combining an amount of calcium orthophosphate (applied after agglomeration) which is sufficient to provide enhanced free flow properties (e.g. 20 to 80 parts per million) with an amount of a phosphorus-containing material having no metallic cations sufficient to provide a substantial boost to the specific capacity improvement provided by the calcium orthophosphate (e.g. up to a maximum total phosphorus content of about 400 parts per million).

The phosphorus-containing material may be added to the tantalum powder in a dry state, but is preferably added in the form of a solution (in an aqueous or partially aqueous solvent) or in the form of a slurry. The material may be added to the tantalum powder in the desired proportion or it may be added initially in a master blend containing substantially more phosphorus than desired in the final material and thereafter blended with additional tantalum powder to produce the desired final composition.

The tantalum powder, as stated above, may be agglomerated or unagglomerated at the time the phosphorus-containing material is applied thereto, and if unagglomerated, it may be thereafter agglomerated or not, as desired. The improvement of this invention is applicable to tantalum powders produced in different ways, such as sodium-reduced tantalum powders and tantalum powders produced from melted ingots (electron beam or arc melted). The tantalum powders, may, if desired, be in hydride form at the time the phosphorus-containing material is added and be reduced to metallic form in subsequent treatment.

The maximum increase in specific capacity is obtained in accordance with this invention when the pressed tantalum anodes made from the powders of this invention are sintered at a relatively low temperature (e.g. 1600° C.). Lesser increases are obtained at higher sintering temperatures (e.g. 1800° C.) and still lesser increases at high sintering temperatures (e.g. 2000° C.).

EXAMPLES 1 and 2

An agglomerated sodium-reduced tantalum powder, designated Example 1, was used as a control.

Calcium orthophosphate was produced by adding orthophosphoric acid to calcium oxide and was washed free of acids before use. Methanol and the washed precipitate of calcium orthophosphate were added to an agglomerated sodium-reduced tantalum powder to form a slurry, and the slurry was dried in air at 90°–100° C. The dried mixture was then stirred in a V-shell blender for three minutes. The amount of calcium orthophosphate was sufficient to make a master mixture containing 800 to 1000 parts per million of the orthophosphate ion, $PO_4^{-3}$, corresponding to about 261 to about 326 parts per million of elemental phosphorus. The mixture was blended with an additional amount of the same lot of agglomerated sodium reduced tantalum powder as in Example 1 to produce a final concentration of 115 parts per million of the orthophosphate ion, corresponding to 37.5 ppm of elemental phosphorus. This phosphorus-containing powder is designated Example 2.

The tantalum control powder of Example 1 was found to have a Hall flow of 46 seconds when measured in accordance with "Standard Method of Test for Flow Rate of Metal Powders," ASTM designation: B213-48 (reapproved 1965), except that the test unit was modified to vibrate the Hall flow cup, and the cup was vibrated at a frequency of 3600 cycles and an amplitude of 0.024 inch. The phosphorus-containing powder of Example 2 had a Hall flow of 27 seconds when measured under the same conditions.

The control powder (Example 1) and the calcium orthophosphate-containing powder (Example 2) were formed into 2-gram anodes by pressing the powder to a density of 6.45 g/cm$^3$. The anodes were sintered either for 30 minutes at 1800° C. or for 30 minutes at 2000° C. in a cold-wall, vacuum sintering furnace ($10^{-5}$ Torr absolute pressure), and then were tested for density and specific capacity (CV/g.).

The testing procedure involved anodizing the sintered anodes in 0.01% phosphoric acid in water. Anodizing was carried out at a current density of 35 milliamps per gram until 200 volts was reached. The anodes sintered at 1800° C. were held at 200 volts for 2 hours. The anodes sintered at 2000° C. were anodized to 270 volts but at a current density of 12 milliamps per gram. The latter anodes were held at 270 volts for 1 hour.

The formed anodes were washed in de-ionized water and then dried in clean air at 105° C. They were then soaked in 10% phosphoric acid for 30 minutes. The capacitance was measured on the anode immersed in 10% phosphoric acid employing a type 1611B General Radio Capacitance Test Bridge with an a.c. signal of 0.5 volts and a d.c. bias of 3 volts. The results are summarized in Table I.

TABLE I

| | | Sintered at 1800° C. | | | Sintered at 2000° C. | | |
|---|---|---|---|---|---|---|---|
| Example No. | Remarks | Sintered Density g/cm$^3$ | Capacitance Micro-farad volts/g (CV/g) | CV/g Improvement % | Sintered Density | Capacitance Micro-farad volts/g (CV/g) | CV/g Improvement % |
| 1 | Control | 7.31 | 4783 | — | 8.58 | 3488 | — |
| 2 | $Ca_2(PO_4)_2$ added to 37.5 ppm P | 7.08 | 5036 | 5.3 | 8.34 | 3550 | 1.8 |

These results show that the addition of calcium orthophosphate to agglomerated sodium-reduced tantalum powder improved flow properties of the powder and resulted in an improvement in specific capacitance.

EXAMPLES 3 to 9

A series of inorganic phosphate compounds were utilized as additives to agglomerated sodium-reduced tantalum powder. The following list of compounds were employed:

| | |
|---|---|
| *$Ca_3(PO_4)_2$ | calcium orthophosphate |
| *$Ba_3(PO_4)_2$ | barium orthophosphate |
| $(NH_4)_2HPO_4$ | ammonium mono-hydrogen orthophosphate |
| $(NH_4)H_2PO_4$ | ammonimum di-hydrogen orthophosphate |
| $NaH_2PO_4.12H_2O$ | sodium di-hydrogen orthophosphate hydrate |
| $Na_2HPO_4.12H_2O$ | sodium mono-hydrogen orthophosphate hydrate |
| $KH_2PO_4$ | potassium di-hydrogen orthophosphate |

*Essentially insoluble in water.

The calcium and barium compounds were prepared in the laboratory by a standard procedure of interacting an alkali metal phosphate with a soluble metallic halide or acetate. The precipitate formed was washed free of reaction products and was employed either as a slurry or a dried powder. The other phosphate compounds were commercially available.

To add phosphorus to the tantalum powder, the appropriate phosphate was either mixed or dissolved in a 30% water-methanol solution. A sufficient amount of the phosphate-containing liquid was added to the tantalum powder to make a thick slurry. The slurry was dried at 90° C. and then thoroughly homogenized in a twin-shell blender. For the calcium and barium salts, a master blend of 1000 ppm of the additive was first prepared and then blended with more tantalum powder to get final concentrations of 30–50 ppm of the $PO_4^{-3}$ ion, corresponding to about 10 to about 16 ppm of elemental phosphorus. The other salts were blended directly to the desired concentration.

Two-gram anodes were pressed to a density of 6.45 g/cm$^3$ from tantalum powder from the same lot of agglomerated sodium-reduced tantalum powder and are designated Example 3. Similar anodes were pressed from the powders containing the various phosphate compound additives and are designated Examples 4 through 9. Anodes of Examples 3 through 9 were sintered in vacuum either for 30 minutes at 1800° C. or for 30 minutes at 2000° C. and tested for specific capacitance using the sintering practice and test conditions described for Examples 1 and 2. Direct current leakage (DCL) also was measured in the electrical tests. The anodes, after anodizing, rinsing and drying, were first tested for DCL. A phosphoric acid solution was employed. The test conditions were as follows:

| Anode Formation Voltage | Test Electrolyte Concentration | Test Voltage |
|---|---|---|
| 200 | 10.0% $H_3PO_4$ | 140 |
| 270 | 0.01% $H_3PO_4$ | 240 |

The anodes were immersed in the test solution to the top of the anode and the proper voltage was applied for 2 minutes, after which the leakage was measured.

After leakage measurements were completed, the anodes formed to 200 volts were placed in a tray containing 10% phosphoric acid and permitted to soak 30 to 45 minutes.

The anodes formed to 270 volts were washed for 3 to 5 minutes in running distilled water and dried 45 minutes at 105°+5° C. in air. They were then soaked in 10% phosphoric acid for 30 to 45 minutes. The capacitance was measured using the procedure described under Examples 1 and 2.

The test results are summarized in Table II. The data show that the addition of small amounts of compounds containing the $PO_4^{-3}$ ion (10 to 16 ppm of elemental phosphorus) to agglomerated sodium-reduced tantalum powder will improve the capacitance of anodes sintered 30 minutes at 1800° C. by about 5 to 7%, and of anodes sintered 30 minutes at 2000° C. by about 1 to 4%. These gains in capacitance were achieved while still maintaining acceptable d.c. leakage levels.

lum powder. This agglomerated EB powder is included as a control in Example 10.

The following series of inorganic phosphate compounds were utilized as additives to agglomerated EB powder from the same lot as the control, Example 10 powder:

| | |
|---|---|
| *$Ca_3(PO_4)_2$ | calcium orthophosphate |
| *$Ba_3(PO_4)_2$ | barium orthophosphate |
| $(NH_4)_2HPO_4$ | ammonium mono-hydrogen orthophosphate |
| $(NH_4)H_2PO_4$ | ammonium di-hydrogen orthophosphate |
| $NaH_2PO_4.12H_2O$ | sodium di-hydrogen orthophosphate hydrate |
| $Na_2HPO_4.12H_2O$ | sodium mono-hydrogen orthophosphate hydrate |
| $KH_2PO_4$ | potassium di-hydrogen orthophosphate |
| *$Pb_3(PO_4)_2$ | lead orthophosphate |

*Essentially insoluble in water

The calcium, barium and lead compounds were prepared in the laboratory by a standard procedure of interacting an alkali metal phosphate with a soluble metallic halide or acetate. The precipitate formed was washed free of reaction products and was employed either as a slurry or a dried powder. The other phosphate compounds were commercially available.

To add phosphorus to the tantalum powder, the appropriate phosphate was either mixed or dissolved in a 30% water-methanol solution. A sufficient amount of the phosphate-containing liquid was added to the tantalum powder to make a thick slurry. The slurry was dried at 90° C. and then thoroughly homogenized in a twin-shell blender. For the calcium and barium salts, a master blend of 1000 ppm of the additive was first prepared and then blended with more tantalum powder to get final concentrations of 30–50 ppm of the $PO_4^{-3}$ ion, corresponding to about 10 to about 16 ppm of elemental phosphorus. The other salts were blended directly to the desired concentration.

Two-gram anodes were pressed to a density of 7.20 g/cm$^3$ from tantalum powder from the same lot of agglomerated EB powder and containing no added phosphorus and are designated Example 10. Similar anodes

TABLE II

EFFECT OF INORGANIC PHOSPHATE COMPOUND ADDITIONS TO AGGLOMERATED SODIUM-REDUCED TANTALUM POWDER ON PROPERTIES OF ANODES PRODUCED THEREFROM

| | | | | Sintered at 1800° C. | | | Sintered at 2000° C. | | |
|---|---|---|---|---|---|---|---|---|---|
| | | Am't Added ppm | | | | | | | |
| Example No. | Compound Added | $PO_4^{-3}$ | P | DCL μa/μfv | Capacitance μfv/g (CV/g) | CV/g Improvement % | DCL μa/μfv | Capacitance μfv/g (CV/g) | CV/g Improvement % |
| 3 | None (control) | — | — | 24 | 4904 | — | 77 | 3405 | — |
| 4 | $Ca_3(PO_4)_2$ | 49 | 16 | 22 | 5218 | 6.4 | 100 | 3545 | 4.0 |
| 5 | $Ba_3(PO_4)_2$ | 37 | 12 | 34 | 5193 | 5.9 | 77 | 3517 | 3.3 |
| 6 | $(NH_4)_2HPO_4$ | 37 | 12 | 34 | 5203 | 6.1 | 92 | 3458 | 1.6 |
| 7 | $(NH_4)H_2PO_4$ | 40 | 13 | 33 | 5168 | 5.4 | 105 | 3512 | 3.1 |
| 8 | $NaH_2PO_4.12H_2O$ | 34 | 11 | 25 | 5199 | 6.0 | 65 | 3470 | 1.9 |
| 9 | $Na_2HPO_4.12H_2O$ | 31 | 10 | 23 | 5069 | 5.2 | 113 | 3449 | 1.3 |

EXAMPLES 10 TO 18

Tantalum powder was produced from an electron beam melted high-purity tantalum ingot by embrittling the ingot by heating it in a hydrogen atmosphere then crushing and pulverizing the resulting friable ingot to yield a tantalum hydride powder. The tantalum hydride powder was converted to an agglomerated tantalum powder (designated hereafter as "agglomerated EB powder") by heating the tantalum hydride powder in vacuum to 1390° C., followed by pulverizing the lightly sintered cake to produce −60 mesh agglomerated tantawere pressed from the powders containing the various phosphate compound additives and are designated Examples 11 through 18. Anodes of Examples 10 through 18 were sintered in vacuum either for 30 minutes at 1800° C. or for 30 minutes at 2000° C. and tested for specific capacitance using the sintering practice and test conditions as described for Examples 1 and 2, and for DCL as described in Examples 3 through 9.

Six anodes prepared from each of the powders of Examples 10 to 18 were sintered for 30 minutes at 2000° C. and were measured for breakdown voltage (BDV).

The breakdown voltage test was carried out by electroforming in an agitated 0.1% $H_3PO_4$ solution at 90°±2° C., with the forming voltage increased at a rate of 3 to 4 volts per minute until dielectric breakdown occurred. The point of breakdown was established when the forming current of the anode increased by 100 m.a. over the current flowing at 100 volts or when scintillation occurred. A mean breakdown voltage was determined after elimination of "outliers". (An outlying observation, or outlier, is one that appears to deviate markedly from other members of the set in which it occurs.) Only one outlier per test lot is acceptable. The procedure of ASTM-E-178-61T. "Tentative Recommended Practice for Dealing with Outlying Observations" was followed.

The test results are listed in Table III. These data show that the addition of small amounts of compounds containing the $PO_4^{-3}$ ion (10 to 16 ppm of elemental phosphorus) to agglomerated EB tantalum ingot powder will improve the capacitance of anodes sintered 30 minutes at 1800° C. by about 5 to 9%, and of anodes sintered 30 minutes at 2000° C. by about 2 to 4%. These gains in capacitance were achieved without significantly altering the DCL. Also, the BDV of the anodes sintered at 2000° C. was not degraded.

TABLE III

EFFECT OF INORGANIC PHOSPHATE COMPOUND ADDITIONS TO AGGLOMERATED EB TANTALUM POWDER ON PROPERTIES OF ANODES PRODUCED THEREFROM

| | | | | Sintered at 1800° C. | | | Sintered at 2000° C. | | | |
|---|---|---|---|---|---|---|---|---|---|---|
| Example No. | Compound Added | Am't Added, ppm $PO_4^{-3}$ | Am't Added, ppm P | DCL μa/μfv | Capacitance μfv/g (CV/g) | CV/g Improvement % | DCL μa/μfv | Capacitance μfv/g (CV/g) | CV/g Improvement % | BDV Volts |
| 10 | None (control) | — | — | 16 | 3998 | — | 67 | 2973 | — | 226 |
| 11 | $Ca_3(PO_4)_2$ | 49 | 16 | 14 | 4372 | 9.3 | 65 | 3081 | 3.6 | 232 |
| 12 | $Ba_3(PO_4)_2$ | 31 | 10 | 16 | 4266 | 6.7 | 65 | 3085 | 3.8 | 227 |
| 13 | $(NH_4)_2HPO_4$ | 37 | 12 | 15 | 4206 | 5.2 | 62 | 3061 | 3.0 | 228 |
| 14 | $(NH_4H_2PO_4$ | 40 | 13 | 14 | 4243 | 6.2 | 53 | 3042 | 2.3 | 226 |
| 15 | $NaH_2PO_4.12H_2O$ | 34 | 11 | 20 | 4310 | 7.8 | 52 | 3072 | 3.3 | 235 |
| 16 | $Na_2HPO_4.12H_2O$ | 31 | 10 | 15 | 4249 | 6.3 | 56 | 3051 | 2.6 | 231 |
| 17 | $KH_2PO_4$ | 35 | 11 | 14 | 4304 | 7.7 | 64 | 3032 | 2.2 | — |
| 18 | $Pb_3(PO_4)_2$ | 47 | 15 | 16 | 4317 | 8.0 | 63 | 3078 | 3.7 | — |

EXAMPLES 19 TO 30

An EB tantalum ingot hydride powder was used as a control, and is designated as Example 19.

These inorganic phosphate compounds were utilized as additives to hydride powder from the same lot as Example 19:

| | |
|---|---|
| $(NH_4)_2HPO_4$ | ammonium mono-hydrogen phosphate |
| $Na_2HPO_4$ | sodium mono-hydrogen phosphate |
| $Ca_3(PO_4)_2$ | calcium orthophosphate |

Hydride powder from the same lot as used in Example 19 was degassed in vacuum to remove the hydrogen, resulting in EB powder. This degassed powder was used as other controls, designated as Examples 23 and 27, according to the subsequent agglomerating treatment used.

The above inorganic phosphate compounds were utilized also as additives to the degassed powder from the same lot as in Examples 23 and 27.

The method of adding phosphorus to the hydride and the EB powder followed the procedure used in Examples 3 to 9 and Examples 10 to 18. The amounts of additives used are listed in Table IV.

The control hydride powder, Example 19, and the phosphate-containing hydride powders, Examples 20, 21 and 22, were converted to an agglomerated EB powder by heating these hydride powders in vacuum for 60 minutes at 1390° C.

The EB powder control, Example 23, and the phosphate-containing EB powders, Examples 24, 25 and 26, were converted to agglomerated EB powders by heating these EB ingot powders in vacuum for 60 minutes at 1390° C.

The EB powder control, Example 27, and phosphate-containing EB powders, Examples 28, 29 and 30, were converted to an agglomerated EB powder by heating these EB powders in vacuum for 60 minutes at 1440° C.

Two-gram anodes were pressed to a density of 7.20 g/cm$^3$ from the powders of Examples 19 to 30. Anodes were sintered either for 30 minutes at 1800° C. or for 30 minutes at 2000° C. and tested for DCL, specific capacitance, and BDV (only on anodes sintered at 2000° C.). The same procedures were used in the electrical test procedures as described in Examples 1 through 18.

The test results are listed in Table IV. Improvements in capacitance for anodes sintered for 60 minutes at 1800° C. ranged from about 17 to 25% when the phosphate compound was added to the hydride powder, and from about 11 to 15% when the addition was made to the EB powder (degassed powder) before agglomeration. For anodes sintered at 2000° C. (30 minutes), the improvement in capacitance resulting from the phosphate additions ranged from about 7 to 13% when added to the hydride powder before agglomeration, and about 4 to 7% when added to EB powder before agglomeration.

TABLE IV

EFFECT OF INORGANIC PHOSPHATE COMPOUND ADDITIONS TO EB TANTALUM HYDRIDE POWDER (EX. NOS. 20-22) AND TO DEGASSED EB POWDER (EX. NOS. 24-26 AND 28-30) BEFORE AGGLOMERATION ON PROPERTIES OF ANODES PRODUCED THEREFROM

| Example No. | Compound Added | Am't Added, ppm $PO_4^{-3}$ | Am't Added, ppm P | Sintered at 1800° C. DCL μa/μfv | Sintered at 1800° C. Capacitance μfv/g (CV/g) | Sintered at 1800° C. CV/g Improvement % | Sintered at 2000° C. DCL μa/μfv | Sintered at 2000° C. Capacitance μfv/g (CV/g) | Sintered at 2000° C. CV/g Improvement % | BDV Volts |
|---|---|---|---|---|---|---|---|---|---|---|
| 19 | None (control) | — | — | 19 | 4099 | — | 116 | 2925 | — | — |
| 20 | $(NH_4)_2HPO_4$ | 576 | 188 | 23 | 4925 | 20.2 | 100 | 3131 | 7.0 | — |
| 21 | $Na_2HPO_4$ | 500 | 163 | 33 | 4818 | 17.5 | 251 | 3067 | 4.9 | — |
| 22 | $Ca_3(PO_4)_2$ | 459 | 150 | 116 | 5107 | 24.6 | 149 | 3318 | 13.4 | — |
| 23 | None (control) | — | — | 12 | 3892 | — | 79 | 2958 | — | 248 |
| 24 | $(NH_4)_2HPO_4$ | 230 | 75 | 13 | 4369 | 12.2 | 71 | 3147 | 6.4 | 236 |
| 25 | $Na_2HPO_4$ | 200 | 65 | 14 | 4394 | 12.9 | 86 | 3124 | 5.6 | 200 |
| 26 | $Ca_3(PO_4)_2$ | 99 | 32 | 22 | 4329 | 11.2 | 63 | 3110 | 5.1 | 215 |
| 27 | None (control) | — | — | 24 | 3915 | — | 62 | 2866 | — | 225 |
| 28 | $(NH_4)_2HPO_4$ | 230 | 75 | 21 | 4451 | 13.7 | 62 | 3006 | 4.9 | 239 |
| 29 | $Na_2HPO_4$ | 200 | 65 | 59 | 4433 | 13.3 | 82 | 2999 | 4.6 | 202 |
| 30 | $Ca_3(PO_4)_2$ | 99 | 32 | 34 | 4495 | 14.9 | 52 | 3014 | 5.2 | 224 |

EXAMPLES 31 TO 46

These examples cover additions of various inorganic phosphate compounds to EB powder before agglomeration. The types and amounts of phosphate-containing compounds used are listed in Table V. The amounts of specific phosphate compounds added to the powder in these examples were considerably less than the amounts used in Examples 23 to 30. The powders were agglomerated for 60 minutes at 1390° C., then tested for DCL, specific capacitance, and BDV by the procedures described in Examples 1 through 30. The data are listed in Table V. A significant improvement in capacitance both with an 1800° C. sinter and a 2000° C. sinter compared to the controls was achieved by additions of all of the phosphate salts investigated down to and including the lowest concentrations of these compounds that were added. These improvements in capacitance were achieved without detrimental effects on d.c. leakage. In these examples, some of the metallic phosphates appeared to cause some reduction in BDV, but additions of $(NH_4)_2HPO_4$, $Pb_3(PO_4)_2$ and $Ca_3(PO_4)_2$, in one of two cases, did not impair BDV.

EXAMPLES 47 TO 51

The powder of Example 47 is an EB tantalum ingot hydride powder having an average particle size of 3.2 microns (F.S.S.S. of 3.2μ) as determined by the procedure of ASTM-B-330-58T, "Tentative Method of Test for Average Particle Size of Refractory Metals and Compounds by Fisher Sub-Sieve Sizer". This powder was used as a control.

A series of progressively higher additions of $(NH_4)H_2PO_4$ were made to hydride powder from the same lot as in Example 47 to provide phosphorus additions of 20, 35, 50 and 150 ppm, and are designated as Examples 48 to 51.

The powders of Examples 47 to 51 were agglomerated at 1375° C. for 30 minutes. Two-gram anodes were pressed from the powder to a density of 7.20 g/cm$^3$. Some anodes were sintered for 30 minutes at 1600° C., and others for 30 minutes at 1800° C. or 30 minutes at 2000° C. These anodes were tested for DCL, specific capacitance, and BDV (only on anodes sintered at 1800° and 2000° C.) using the same test procedures as in earlier examples.

The results are listed in Table VI. As may be seen from the data, an increase in capacitance of up to 35%

TABLE V

EFFECT OF INORGANIC PHOSPHATE COMPOUND ADDITIONS TO EB TANTALUM POWDER BEFORE AGGLOMERATION ON PROPERTIES OF ANODES PRODUCED THEREFROM (POWDER AGGLOMERATED AT 1390° C. FOR 60 MIN.)

| Example No. | Compound Added | Am't Added, ppm $PO_4^{-3}$ | Am't Added, ppm P | Sintered at 1800° C. DCL μa/μfv | Sintered at 1800° C. Capacitance μfv/g (CV/g) | Sintered at 1800° C. CV/g Improvement % | Sintered at 2000° C. DCL μa/μfv | Sintered at 2000° C. Capacitance μfv/g (CV/g) | Sintered at 2000° C. CV/g Improvement % | BDV Volts |
|---|---|---|---|---|---|---|---|---|---|---|
| 31 | None (control) | — | — | 16 | 3818 | — | 40 | 2931 | — | 221 |
| 32 | $(NH_4)_2HPO_4$ | 115 | 37 | 31 | 4158 | 8.9 | 38 | 3036 | 3.4 | 239 |
| 33 | $Na_2HPO_4$ | 106 | 35 | 20 | 4244 | 11.2 | 44 | 3054 | 4.2 | 204 |
| 34 | $Ca_3(PO_4)_2$ | 50 | 17 | 45 | 4204 | 10.1 | 38 | 3032 | 3.5 | 226 |
| 35 | None (control) | — | — | 19 | 3930 | — | 80 | 2967 | — | 239 |
| 36 | $KH_2PO_4$ | 100 | 33 | 15 | 4318 | 9.8 | 86 | 3035 | 2.3 | 226 |
| 37 | $Pb_3(PO_4)_2$ | 100 | 33 | 13 | 4308 | 9.6 | 85 | 3039 | 3.8 | 240 |
| 38 | $Ba_3(PO_4)_2$ | 100 | 33 | 23 | 4450 | 13.2 | 93 | 3269 | 10.2 | 203 |
| 39 | None (control) | — | — | 13 | 3946 | — | 82 | 2835 | — | 240 |
| 40 | $(NH_4)_2HPO_4$ | 57 | 19 | 11 | 4350 | 10.2 | 74 | 2888 | 1.9 | 248 |
| 41 | $Na_2HPO_4$ | 53 | 17 | 12 | 4389 | 11.2 | 87 | 2927 | 3.2 | 209 |
| 42 | $Ca_3(PO_4)_2$ | 25 | 8 | 17 | 4259 | 7.9 | 74 | 2914 | 2.8 | 216 |
| 43 | None (control) | — | — | 16 | 3963 | — | 83 | 2900 | — | 240 |
| 44 | $KH_2PO_4$ | 50 | 16 | 15 | 4276 | 7.8 | 85 | 2967 | 2.3 | 217 |
| 45 | $Pb_3(PO_4)_2$ | 50 | 16 | 13 | 4269 | 7.7 | 58 | 2951 | 1.8 | 241 |
| 46 | $Ba_3(PO_4)_2$ | 50 | 16 | 25 | 4392 | 10.8 | 68 | 3099 | 6.7 | 209 |

occurred with the 1600° C. sinter, up to 23% with the 1800° C. sinter, and up to 6.5% with the 2000° C. sinter. The phosphate addition appears to act as a sintering inhibitor: the larger the quantity, the greater the effect. The BDV and DCL of the anodes sintered at 2000° C. did not appear to be adversely affected at any of the phosphorous levels, however, the BDV of anodes sintered at 1800° C. using powder with the highest phosphorus level showed some decrease.

TABLE VI

EFFECT OF $(NH_4)_2HPO_4$ ADDITIONS TO 3.2 MICRON TANTALUM HYDRIDE POWDER BEFORE AGGLOMERATION ON PROPERTIES OF ANODES PRODUCED THEREFROM

| | | Sintered at 1600° C. | | | Sintered at 1800° C. | | | | Sintered at 2000° C. | | | |
|---|---|---|---|---|---|---|---|---|---|---|---|---|
| Ex. No. | Amount P Added, ppm | DCL μa/μfv | Capacitance μfv/g (CV/g) | CV/g Improved % | DCL μa/μfv | Capacitance μfv/g (CV/g) | CV/g Improved % | BDV Volts | DCL μa/μfv | Capacitance μfv/g (CV/g) | CV/g Improved % | BDV Volts |
| 47 | None (control) | 14 | 5556 | — | 21 | 4250 | — | 218 | — | 2832 | — | 256 |
| 48 | 20 | 16 | 6831 | 22.9 | 20 | 4763 | 12.1 | 207 | 74 | 2820 | — | 263 |
| 49 | 35 | 16 | 6932 | 24.8 | 21 | 4897 | 15.2 | 216 | 61 | 2921 | 3.1 | 256 |
| 50 | 50 | 14 | 7021 | 26.4 | 23 | 5003 | 17.7 | 221 | 60 | 2966 | 4.7 | 260 |
| 51 | 150 | 12 | 7512 | 35.2 | 15 | 5258 | 23.7 | 186 | 75 | 3015 | 6.5 | 262 |

EXAMPLES 52 TO 67

These examples are similar to Examples 47 to 51 except that data are included on EB tantalum hydride powder having F.S.S.S. values of 3.2, 3.7 and 4.2 microns. Additions of $(NH_4)_2HPO_4$ in the amounts listed in Tables VII and VIII were made to the hydride powder before the agglomeration treatments.

TABLE VII

EFFECT OF $(NH_4)_2HPO_4$ ADDITIONS TO EB TANTALUM HYDRIDE POWDER OF DIFFERENT PARTICLE SIZES BEFORE AGGLOMERATION ON THE PROPERTIES OF ANODES PRODUCED THEREFROM

| | | | | Sintered at 1600° C. | | Sintered at 1800° C. | | | Sintered at 2000° C. | | |
|---|---|---|---|---|---|---|---|---|---|---|---|
| Example No. | Hydride FSSS. μ | Am't of Compound added, ppm $PO_4^{-3}$ | P | Capacitance μfv/g (CV/g) | CV/g Improved % | Capacitance μfv/g (CV/g) | CV/g Improved % | DCL μa/μfv | Capacitance μfv/g (CV/g) | CV/g Improved % | BDV Volts |
| 52 | 3.2 | None | (control) | 5630 | — | 4176 | — | 72 | 2832 | — | 260 |
| 53 | 3.2 | 153 | 50 | 7426 | 31.9 | 5022 | 20.3 | 86 | 3003 | 6.0 | 255 |
| 54 | 3.2 | 460 | 150 | 7512 | 33.4 | 5258 | 25.9 | 75 | 3015 | 6.5 | 262 |
| 55 | 3.7 | None | (control) | 5455 | — | 4207 | — | 77 | 2862 | — | — |
| 56 | 3.7 | 307 | 100 | 6690 | 22.6 | 4974 | 18.2 | 65 | 3147 | 10.0 | — |
| 57 | 4.2 | None | (control) | 5200 | — | 3900 | — | — | 2900 | — | — |
| 58 | 4.2 | 153 | 50 | 6177 | 18.7 | 4647 | 19.2 | 87 | 3113 | 7.3 | 255 |
| 59 | 4.2 | 460 | 150 | 6168 | 18.6 | 4619 | 18.4 | 73 | 3099 | 6.9 | 248 |

TABLE VIII

EFFECT OF $(NH_4)_2HPO_4$ ADDITIONS TO EB TANTALUM HYDRIDE POWDER OF DIFFERENT PARTICLE SIZES BEFORE PRE-AGGLOMERATION AND AGGLOMERATION ON THE PROPERTIES OF ANODES PRODUCED THEREFROM

| | | | | Sintered at 1600° C. | | Sintered at 1800° C. | | | Sintered at 2000° C. | | |
|---|---|---|---|---|---|---|---|---|---|---|---|
| Example No. | Hydride FSSS. μ | Amount of Compound Added, ppm $PO_4^{-3}$ | P | Capacitance μfv/g (CV/g) | CV/g Improved % | Capacitance μfv/g (CV/g) | CV/g Improved % | DCL μa/μfv | Capacitance μfv/g (CV/g) | CV/g Improved % | BDV Volts |
| 60 | 3.2 | None | (control) | 5630 | — | 4176 | — | 72 | 2832 | — | 260 |
| 61 | 3.2 | 153 | 50 | 7483 | 32.9 | 4795 | 14.8 | 80 | 3079 | 8.7 | 251 |
| 62 | 3.2 | 460 | 150 | 7541 | 33.9 | 5308 | 27.1 | 72 | 3080 | 8.8 | 251 |
| 63 | 3.7 | None | (control) | 5526 | — | 4202 | — | 77 | 2923 | — | — |
| 64 | 3.7 | 307 | 100 | 6797 | 23.0 | 5025 | 19.6 | 65 | 3153 | 7.9 | — |
| 65 | 4.2 | None | (control) | 5200 | — | 3900 | — | — | 2900 | — | — |
| 66 | 4.2 | 153 | 50 | 6235 | 19.9 | 4697 | 20.4 | 89 | 3180 | 9.7 | 243 |
| 67 | 4.2 | 460 | 150 | 6254 | 20.3 | 4707 | 20.7 | 81 | 3126 | 7.8 | 241 |

In Examples 52 to 59, Table VII, the hydride powders were agglomerated in one treatment for 30 minutes at 1375° C. In Examples 60 to 67, Table VIII, the hydride powders first were subjected to a pre-agglomeration treatment for 60 minutes at 1200° C., followed by an agglomeration treatment for 30 minutes at 1375° C.

Two-gram anodes were pressed from the powders to a density of 7.20 g/cm$^3$, and then were sintered at 1600° C. (30 minutes), or at 1800° C. (30 minutes), or at 2000° C. (30 minutes), and then were tested as described in earlier examples.

The results show that the particle size of the precursor powder before either of the agglomeration treatments has a considerable bearing on the change of capacitance with the amount of phosphate added to the hydride powder before agglomeration. At a 50 ppm level of phosphorus addition, the increase in capacitance with a 1600° C. sinter over that of the control is up to 34% for a 3.2 micron powder before agglomeration and up to 20% for a 4.2 micron powder.

EXAMPLES 68 TO 77

In these examples, additions of up to 376 ppm of phosphorus were made in the form of $(NH_4)H_2PO_4$ to EB tantalum ingot hydride powder, and also to EB hydride powder from the same lot after agglomeration for 30 minutes at 1375° C. The specific amounts of added phosphate compound in each example are listed in Table IX. Data also are included on particle size (F.S.S.S) and Scot density of the powders after agglomeration. Scott density (or apparent density) was determined by the procedure of ASTM-B-329-61, "Standard Method of Test for Apparent Density of Refractory Metals and Compounds by Scott Volumeter".

Two-gram anodes were pressed from these powders to a density of 7.20 g/cm$^3$, and then were sintered either for 30 minutes at 1800° C. or 30 minutes at 2000° C. and tested for electrical characteristics using the test procedures described in earlier examples.

The results in Table IX show:

1. When the phosphate addition is made before agglomeration, the resultant agglomerated powders have a somewhat lower scott density and a particle size (F.S.S.S., in microns) of only about 60 to 70% of that of the agglomerated control powder.

2. These added amounts of the phosphate salt resulted in an increase in specific capacitance of up to 20% for anodes sintered at 1800° C. These additions generally did not significantly impair DCL or BDV.

test methods that were used are described in earlier examples.

The results are shown in Table X. These high phosphate additions resulted in a sizeable increase in capacitance and had no significant effect on DCL; however, the increase in capacitance was no greater than that achieved with much lower levels (<400 ppm added phosphorus). Therefore, there is no benefit attained by these large additions, and the actual swelling of the anodes during sintering is undesirable.

TABLE X

EFFECT OF LARGE ADDITIONS OF $(NH_4)_2HPO_4$ TO AGGLOMERATED EB TANTALUM POWDER ON THE PROPERTIES OF ANODES PRODUCED THEREFROM

| Example | Quantity of Compound Added, ppm | | Sintered at 1600° C. | | |
|---|---|---|---|---|---|
| | | | DCL | Capacitance μfv/g | CV/g Improved |
| No. | $PO_4^{-3}$ | P | μa/μfv | (CV/g) | % |
| 78 | None | (control) | 14 | 4855 | — |
| 79 | 2107 | 687 | 16 | 5826 | 20.0 |
| 80 | 2462 | 805 | 17 | 5771 | 18.9 |
| 81 | 2850 | 929 | 16 | 5787 | 19.2 |

TABLE IX

EFFECT OF $(NH_4)H_2PO_4$ ADDITIONS TO EB TANTALUM HYDRIDE POWDER (EX. 69-72) AND TO THE AGGLOMERATED POWER PRODUCED THEREFROM (EX. 74-77) ON THE PROPERTIES OF THE AGGLOMERATED POWDER AND ON THE ANODES PRODUCED THEREFROM

| Example | Amount of Compound Added, ppm | | Agglomerated Powder Particle Size | Agglomerated Powder Scott Density | Sintered at 1800° C. | | | Sintered at 2000° C. | | | |
|---|---|---|---|---|---|---|---|---|---|---|---|
| | | | | | DCL | Capacitance μfv/g | CV/g Improved | DCL | Capacitance μfv/g | CV/g Improved | BDV |
| No. | $PO_4^{-3}$ | P | FSSS. μ | g/in$^3$ | μa/μfv | (CV/g) | % | μa/μfv | (CV/g) | % | Volts |
| 68 | None | (control) | 0.3 | 72.6 | 30 | 4101 | — | 49 | 3011 | — | 244 |
| 69 | 577 | 188 | 6.1 | 65.5 | 22 | 4872 | 18.8 | 56 | 3093 | 2.7 | 243 |
| 70 | 721 | 235 | 6.2 | 67.2 | 21 | 4843 | 18.1 | 54 | 3035 | 0.8 | — |
| 71 | 865 | 282 | 6.6 | 67.9 | 21 | 4915 | 19.8 | 57 | 3113 | 3.3 | 246 |
| 72 | 1,543 | 376 | 6.7 | 69.2 | 18 | 4844 | 18.1 | 50 | 3115 | 3.4 | 222 |
| 73 | None | (control) | 10.3 | 72.6 | 28 | 4123 | — | 53 | 3056 | — | 237 |
| 74 | 577 | 188 | 10.5 | 73.5 | 26 | 4777 | 15.9 | 66 | 3195 | 4.5 | 256 |
| 75 | 721 | 235 | 10.8 | 73.0 | 21 | 4776 | 15.8 | 66 | 3170 | 3.7 | — |
| 76 | 865 | 282 | 11.0 | 72.5 | 25 | 4803 | 16.5 | 45 | 3157 | 3.3 | 239 |
| 77 | 1,153 | 376 | 13.5 | 72.9 | 26 | 4865 | 18.0 | 41 | 3163 | 3.5 | 237 |

EXAMPLES 78 TO 81

In another experiment, designated Examples 78 to 81, large additions of $(NH_4)_2HPO_4$ were made to an agglomerated EB tantalum powder. The amounts of the phosphate additions listed in Table X, covered the concentration range of 687 to 929 ppm of elemental phosphorus (0.40 to 0.54 atomic percent), a higher range than that contemplated by this invention.

Two-gram anodes of the phosphate-containing powders were pressed to a density of 7.20 g/cm$^3$ and sintered for 30 minutes at 1600° C. The as-pressed anodes were 0.258 inches diameter and 0.323±0.001 inches length. After sintering, the control anodes averaged 0.251 inches diameter and 0.314 inches length; the phosphate-containing anodes hardly showed any shrinkage, and even exhibited swelling in some cases, and they averaged 0.259 inches diameter and 0.321 inches length.

The anodes were tested for DCL and specific capacitance. Breakdown voltage was determined on additional anodes sintered for 30 minutes at 1800° C. The

EXAMPLES 82 TO 91

In earlier examples of the phosphorus-containing additives were various inorganic phosphate salts. In these examples, phosphoric acid was added to either EB tantalum hydride powder (F.S.S.S. of 3.2 microns) or to agglomerated powder produced from hydride powder from the same lot.

The powders were agglomerated for 60 minutes at 1365° C. Two-gram anodes were pressed from these powders to a density of 7.20 g/cm$^3$, sintered either for 30 minutes at 1600° C. or for 30 minutes at 1800° C., and tested for DCL and specific capacitance using the procedures described in earlier examples. The results are shown in Table XI.

These data show that additions of phosphoric acid made either to EB hydride powder or to agglomerated EB powder resulted in a large increase in capacitance over that of the control powder. The magnitudes of the increases in capacitance were similar to those demonstrated for additions of inorganic phosphates in earlier examples. DCL was not impaired by the phosphoric acid additions.

TABLE XI

EFFECT OF PHOSPHORIC ACID ADDITIONS TO EB TANTALUM HYDRIDE POWDER (EX. 83-86) AND TO AGGLOMERATED EB POWDER PRODUCED THEREFROM (EX. 88-91) ON THE PROPERTIES OF ANODES PRODUCED THEREFROM (POWDER AGGLOMERATED AT 1365° C. FOR 60 MIN.)

| Example | Amount of Compound Added, ppm | | Sintered at 1600° C. | | | Sintered at 1800° C. | | |
|---|---|---|---|---|---|---|---|---|
| | | | DCL | Capacitance | CV/g Improved | DCL | Capacitance | CV/g Improved |
| No. | $PO_4^{-3}$ | P | μa/μfv | μfv/g (CV/g) | % | μa/μfv | μfv/g (CV/g) | % |
| 82 | None | (control) | 13 | 5823 | — | 24 | 4322 | — |
| 83 | 31 | 10 | 14 | 6969 | 19.7 | 25 | 4857 | 12.4 |
| 84 | 92 | 30 | 13 | 7153 | 22.8 | 18 | 5048 | 16.8 |
| 85 | 184 | 60 | 14 | 7197 | 23.6 | 18 | 5194 | 20.2 |
| 86 | 307 | 100 | 27 | 7237 | 24.3 | 19 | 5258 | 21.7 |
| 87 | None | (control) | 12 | 5768 | 0 | 18 | 4426 | — |
| 88 | 31 | 10 | 11 | 6538 | 13.3 | 17 | 4870 | 10.0 |
| 89 | 92 | 30 | 13 | 6725 | 16.6 | 18 | 5104 | 15.3 |
| 90 | 184 | 60 | 18 | 6911 | 19.8 | 17 | 5221 | 18.0 |
| 91 | 307 | 100 | 12 | 7032 | 21.9 | 16 | 5229 | 18.1 |

EXAMPLES 92 TO 93

An agglomerated EB tantalum powder was treated with a solution of sodium hypophosphite, $NaH_2PO_2H_2O$ to produce an added phosphorus concentration of 150 ppm. Two-gram anodes were pressed from the untreated control powder (Example 92) and the phosphite-treated powder (Example 93) to a density of 7.20 g/cm$^3$, sintered for 30 minutes at 1600° C., and tested using the procedures described in earlier examples. The results are shown in Table XII.

TABLE XII

| Ex. No. | Quantity of Contained P Added, ppm | Sintered at 1600° C. (30 Min.) Shrinkage During Sintering, % | Capacitance μfv/g (CV/g) | CV/g Improvement % |
|---|---|---|---|---|
| 92 | None (control) | 4.46 | 5327 | — |
| 93 | 150 | 0.62 | 6493 | 21.8 |

These data show that additions of the phosphite salt to tantalum powder resulted in an increase in capacitance over that of the control powder. The improvement with the phosphite addition was similar to that produced by additions of phosphate salts as shown in earlier examples.

EXAMPLES 94 TO 101

Agglomerated EB tantalum powder was treated with various inorganic phosphate salts using concentrations of 9 to 50 ppm contained phosphorus ion in a large number of experimental runs. Untreated powders from the same lots were used as controls. Two-gram anodes were pressed from these powders to a density of 7.20 g/cm$^3$, sintered for 30 minutes at 2000° C., and tested for BDV. The results are shown in Table XIII.

Any of these phosphate compounds including phosphoric acid, $H_3PO_4$, can be used as an additive to tantalum capacitor powders to increase capacitance of sintered anodes, as shown in Examples 3 to 18, and in other earlier examples. However, if it is desired to simultaneously maintain highest breakdown voltage, the preferred additives are those which contain no metallic cations, such as the ammonium phosphate salts and phosphoric acid.

TABLE XIII

| Example No. | Anodes Tested: No Runs | Anodes Run | Total Tested | Inorganic Phosphate Salt Added to EB Powder: Salt | Cations | Sintered at 2000° C. BDV Volts. Avg. |
|---|---|---|---|---|---|---|
| 94 | 11 | 6 | 66 | None (control) | | 240 |
| 95 | 10 | 6 | 60 | $(NH_4)_2HPO_4$ | $2NH_4^{+1} + H^{+1}$ | 244 |
| 96 | 2 | 2 | 12 | $H_3PO_4$ | $H^{+1}$ | 244 |
| 97 | 5 | 6 | 30 | $Pb_3(PO_4)_2$ | $Pb^{+2}$ | 240 |
| 98 | 9 | 6 | 54 | $Ca_3(PO_4)_2$ | $Ca^{+2}$ | 223 |
| 99 | 4 | 6 | 24 | $KH_2PO_4$ | $K^{+1} + 2H^{+1}$ | 220 |
| 100 | 10 | 6 | 60 | $Na_2HPO_4.12H_2O$ | $2Na^{+1} + H^{+1}$ | 209 |
| 101 | 5 | 6 | 30 | $Ba_3(PO_4)_2$ | $Ba^{+2}$ | 207 |

EXAMPLES 102 AND 103

EB tantalum ingot hydride powder with a F.S.S.S. of approximately 2 microns was used as a control in Example 102. An addition of $(NH_4)_2HPO_4$ was made to another portion of EB hydride powder from the same lot. The amount of the compound added was 307 ppm $PO_4^{-3}$ ion, or 100 ppm of elemental phosphorus. These powders were degassed, and did not receive an agglomeration treatment. Two-gram anodes were pressed from the powders, sintered for 30 minutes at 1800° C. and tested for specific capacitance using the previously described procedures. The control anodes, Example 102, had a capacitance of 2700 CV/g, while the anodes made using the phosphorus-containing powder, Example 103, had a capacitance of 3608 CV/g, an increase of 33.0% over the control.

EXAMPLES 104 TO 106

Sodium-reduced tantaum powder that had not received an agglomeration treatment was used as a control, Example 104. Other portions of powder from the same lot were treated with $(NH_4)_2HPO_4$ to provide additions of 50 and 100 ppm of elemental phosphorus. Two-gram anodes were pressed from these powders to a density of 6.45 g/cm$^3$, and were sintered either for 30 minutes at 1600° C. or 30 minutes at 1800° C. and then tested for DCL, specific capacitance, and BDV (on anodes sintered at 1800° C. only) using the procedures described in earlier examples.

The results are shown in Table XIV. The addition of the phosphate compound to these sodium-reduced powders produced appreciable increases in capacitance without impairing DCL or BDV.

TABLE XIV

EFFECT OF $(NH_4)_2HPO_4$ ADDITIONS TO SODIUM-REDUCED TANTALUM POWDER ON THE PROPERTIES OF ANODES PRODUCED THEREFROM

| Example | Amount of Compound Added, ppm | | Sintered at 1600° C. | | | Sintered at 1800° C. | | | |
|---|---|---|---|---|---|---|---|---|---|
| | | | DCL | Capacitance μfv/g | CV/g Improved | DCL | Capacitance μfv/g | CV/g Improved | BDV |
| No | $PO_4^{-3}$ | P | μa/μfv | (CV/g) | % | μa/μfv | (CV/g) | % | Volts |
| 104 | None | (control) | 13 | 5953 | — | 24 | 4900 | — | 161 |
| 105 | 153 | 50 | 21 | 6512 | 9.4 | 24 | 5206 | 6.2 | 167 |
| 106 | 307 | 100 | 26 | 6647 | 11.7 | 22 | 5249 | 7.1 | 157 |

EXAMPLES 107 TO 109

EB tantalum hydride powder with a F.S.S.S. of 3.2 microns was agglomerated for 30 minutes at 1365° C. and crushed to −35 mesh powder. Two-gram anodes were pressed from the powder to a density of 7.20 g/cm$^3$. The anodes were divided into three groups, Examples 107 to 109. The average pore volume in the anodes was calculated from the density. A solution of amonium mono-hydrogen phosphate was applied using an eyedropper to saturate the anodes and achieve two levels of additions, plus the zero level of the control, shown in Table XV. The anodes were dried in air, then were sintered for 30 minutes at 1600° C. and tested for percent shrinkage during sintering and specific capacitance, using the test methods described in earlier examples. The results are shown in Table XV.

TABLE XV

| Example | Amount of Compound Added, ppm | | Sintered at 1600° C. | | |
|---|---|---|---|---|---|
| | | | Shrinkage During | Capacitance μfv/g | CV/g Improvement |
| No. | $PO_4^{-3}$ | P | Sintering, % | (CV/g) | % |
| 107 | None | (control) | 4.07 | 5880 | — |
| 108 | 460 | 150 | 1.55 | 7014 | 19.3 |
| 109 | 920 | 300 | 1.16 | 7146 | 21.5 |

These data show that additions of phosphate salts to as-pressed anodes before sintering resulted in significantly higher capacitance after sintering as compared to anodes similarly sintered from as-pressed anodes to which no phosphorus had been added.

It will be understood by those skilled in the art that variations and modifications of the specific embodiments described above may be employed without departing from the scope of the invention as defined in the appended claims.

What is claimed is:

[1. A tantalum powder containing an added phosphorus-containing material in an amount equivalent to from about 5 to about 400 parts per million of elemental phosphorus.]

[2. A tantalum powder in accordance with claim 1 in which the powder particles are agglomerated.]

[3. A tantalum powder in accordance with claim 1 in which the powder particles are unagglomerated.]

[4. A tantalum powder in accordance with claim 2 in which said phosphorus-containing material is added to said tantalum powder prior to the agglomeration thereof.]

[5. A tantalum powder in accordance with claim 2 in which said phosphorus-containing material is added to said tantalum powder after the agglomeration thereof.]

[6. A tantalum powder in accordance with claim 2 in which at least a portion of said phosphorus-containing material is calcium orthophosphate, added after agglomeration in an amount equivalent to from about 20 to about 80 parts per million of elemental phosphorus.]

[7. A tantalum powder in accordance with claim 1 in which the phosphorus-containing material is free of metallic cations.]

[8. A tantalum powder in accordance with claim 2 in which a major portion of the phosphorus in said powder is obtained by the addition of a phosphorus-containing material having no metallic cations and a minor portion is obtained by the addition of calcium orthophosphate after agglomeration in an amount not exceeding about 80 parts per million of elemental phosphorus.]

9. A tantalum powder in accordance with claim [1] *32* in which at least a major portion of said phosphorus-containing material is added in the form of an orthophosphate compound of the group consisting of ammonium orthophosphate, ammonium hydrogen orthophosphate, ammonium di-hydrogen orthophosphate, and orthophosphoric acid.

[10. A tantalum anode prepared by pressing and sintering the tantalum powder of claim 1.]

[11. A tantalum anode prepared by pressing tantalum powder into the shape of an anode, adding to said pressed tantalum powder a phosphorus-containing material in an amount equivalent to from about 5 to about 400 parts per million of elemental phosphorus, and thereafter sintering said pressed tantalum powder.]

[12. A method of improving a tantalum powder which comprises adding to said powder an amount of a phosphrous-containing material corresponding to from about 5 to about 400 parts per million of phosphorus.]

[13. A method in accordance with claim 1 in which said tantalum powder is agglomerated prior to the addition of said phosphorus-containing material.]

[14. A method in accordance with claim 12 in which said phosphorus-containing material is added to said powder prior to agglomeration.]

[15. A method in accordance with claim 12 in which said phosphorus-containing material comprises a minor proportion of calcium orthophosphate and a larger proportion of a phosphorus-containing material having no metallic cations, said calcium orthophosphate being added after agglomeration in an amount equivalent to from about 20 to about 80 parts per million of elemental phosphorus.]

16. A method of improving a tantalum powder which comprises adding to said powder while it is in the form of tantalum hydride an amount of phosphorus-containing material corresponding to from about [5] *37.5* to about 400 parts per million of phosphorus and thereafter converting said tantalum hydride to metallic tantalum.

17. A method in accordance with claim 16 in which said tantalum hydride is converted to metallic tantalum during agglomeration.

18. A method in accordance with claim 16 in which said tantalum hydride is converted to metallic tantalum and thereafter agglomerated.

[19. A method of forming an improved tantalum anode which comprises pressing and sintering the tantalum powder of claim 1.]

[20. A method of forming an improved tantalum anode which comprises pressing a tantalum powder into the shape of an aode, adding to said pressed tantalum powder to phosphorus-containing material in an amount equivalent to from about 5 to about 400 parts per million of elemental phosphorus, and thereafter sintering said pressed tantalum powder.]

*21. A method of increasing the specific capacitance of a tantalum powder which comprises adding to said powder an amount of a phosphorus-containing material sufficient to provide an improved level of specific capacitance, the amount of added phosphorus-containing material being within the range corresponding to from about 5 to about 400 parts per million of phosphorus, said phosphorus-containing material comprising a minor proportion of calcium orthophosphate and a larger proportion of a phosphorus-containing material having no metallic cations, said calcium orthophosphate being added after agglomeration in an amount equivalent to from about 20 to about 80 parts per million of elemental phosphorus.*

*22. A tantalum powder containing an added phosphorus-containing material in an amount equivalent to from about 37.5 to about 400 parts per million of elemental phosphorus.*

*23. A tantalum powder as in claim 22 containing an added phosphorus-containing material in an amount equivalent to at least about 50 parts per million of elemental phosphorus.*

*24. A tantalum powder as in claim 22 containing an added phosphorus-containing material in an amount equivalent to at least 65 parts per million of elemental phosphorus.*

*25. A tantalum anode prepared by pressing and sintering the tantalum powder of claim 22.*

*26. A method of improving the specific capacity of tantalum powder for use in making tantalum anodes comprising adding to tantalum powder an amount of an ammonium hydrogen phosphate, within the range equivalent to from about 20 to about 400 parts per million of elemental phosphorus, sufficient to improve the specific capacity (CV/g) of the untreated tantalum by at least about 8.9% when pressed in the forms of anodes and sintered at 1800° C.*

*27. A method of improving the specific capacity of tantalum powder for use in making tantalum anodes comprising adding to tantalum powder, which is in the form of tantalum hydride prior to reduction to metallic tantalum, an amount of phosphorus-containing material, within the range equivalent to from about 37.5 to about 400 parts per million of elemental phosphorus, sufficient to improve the specific capacity (CV/g) of the untreated tantalum by at least 5.2% when pressed in the form of anodes and sintered at 1800° C.*

*28. A method of forming an improved tantalum anode having improved capacitance which comprises pressing a tantalum powder into the shape of an anode, adding to said pressed tantalum powder an amount of a phosphorus-containing material sufficient to provide the improved level of specific capacitance, said phosphorus-containing material being added in an amount equivalent to from about 37.5 to about 400 parts per million of elemental phosphorus and thereafter sintering said pressed tantalum powder.*

*29. A method of improving the specific capacity of tantalum powder for use in making tantalum anodes comprising adding to tantalum powder an amount of phosphorus-containing material, within the range equivalent to from about 50 to about 400 parts per million of elemental phosphorus, sufficient to improve the specific capacity (CV/g) of the untreated tantalum by at least 5.2% when pressed in the form of anodes and sintered at 1800° C.*

*30. A method as in claim 29 in which the phosphorus-containing material is present in an amount equivalent to at least about 65 parts per million of elemental phosphorus.*

*31. A tantalum powder characterized by increased specific capacitance and improved flow characteristics containing calcium orthophosphate added after agglomeration in an amount equivalent to about 20 to about 80 parts per million of elemental phosphorus.*

*32. A tantalum powder characterized by increased specific capacitance containing an added phosphorus-containing material which is free of metallic cations in an amount equivalent to from about 5 to about 400 parts per million of elemental phosphorus.*

*33. A tantalum powder characterized by increased specific capacitance and improved flow properties containing an added phosphorus material which is comprised of a phosphorus-containing material having no metallic cations and a minor amount, not exceeding about 80 parts per million of elemental phosphorus, of calcium orthophosphate added after agglomeration, the total amount of added phosphorus-containing material being in an amount equivalent to from about 5 to about 400 parts per million of elemental phosphorus.*

*34. A method of improving the specific capacity of tantalum powder for use in making tantalum anodes comprising adding to tantalum powder an amount of phosphorus-containing material, within the range equivalent to from about 37.5 to about 400 parts per million of elemental phosphorus, sufficient to improve the specific capacity (CV/g) of the untreated tantalum by at least about 5.2%* when *pressed in the form of anodes and sintered at 1800° C.*

*35. A method in accordance with claim 34 in which the phosphorus-containing material is phosphoric acid.*

*36. A method in accordance with claim 34 in which the phosphorus-containing material is added to tantalum powder which is in the form of metallic tantalum.*

* * * * *